United States Patent
Lyu et al.

(10) Patent No.: US 12,129,102 B1
(45) Date of Patent: Oct. 29, 2024

(54) HIGH-STRENGTH PACKAGING BAG WITH EFFECTS OF HEAT PRESERVATION AND WATERTIGHTNESS, AND PREPARATION PROCESS THEREOF

(71) Applicant: DONGGUAN TAIHONG PACKAGING CO., LTD, Guangdong (CN)

(72) Inventors: Deran Lyu, Guangdong (CN); Haijiang Lan, Guangdong (CN); Chao Xu, Guangdong (CN); Long Xie, Guangdong (CN); Wenxiu Wang, Guangdong (CN)

(73) Assignee: DONGGUAN TAIHONG PACKAGING CO., LTD, Guangdong (CN)

( * ) Notice: Subject to any disclaimer, the term of this patent is extended or adjusted under 35 U.S.C. 154(b) by 0 days.

(21) Appl. No.: 18/604,575

(22) Filed: Mar. 14, 2024

Related U.S. Application Data

(63) Continuation of application No. PCT/CN2024/075144, filed on Feb. 1, 2024.

(30) Foreign Application Priority Data

Jan. 23, 2024  (CN) .......................... 202410099462.7

(51) Int. Cl.
*B65D 81/38* (2006.01)
*B32B 7/12* (2006.01)
(Continued)

(52) U.S. Cl.
CPC ............ *B65D 81/3897* (2013.01); *B32B 7/12* (2013.01); *B32B 29/02* (2013.01); *B65D 81/022* (2013.01);
(Continued)

(58) Field of Classification Search
CPC ....... B32B 7/12; B32B 29/02; B32B 2250/40; B32B 2255/12; B32B 2255/26;
(Continued)

(56) References Cited

U.S. PATENT DOCUMENTS 3,349,990 A * 10/1967 Woodford ............ B65D 27/005
383/110
3,868,056 A * 2/1975 Keren ...................... B32B 29/02
206/521
(Continued)

FOREIGN PATENT DOCUMENTS

CN 109177346 A 1/2019
CN 113715420 A * 11/2021
(Continued)

OTHER PUBLICATIONS

National Standards of the People's Republic of China; "Boxboard"; Oct. 20, 2023; 21 pages.
(Continued)

*Primary Examiner* — Michael C Romanowski
*Assistant Examiner* — Thomas J Kessler
(74) *Attorney, Agent, or Firm* — Cooper Legal Group, LLC

(57) ABSTRACT

A high-strength packaging bag with effects of heat preservation and watertightness is made of a composite paper. The composite paper includes an outer waterproof layer, an outer paper layer, a first adhesive layer, a heat-insulation and cushioning layer, a second adhesive layer, an inner paper layer and an inner waterproof layer arranged in sequence; and the first adhesive layer and the second adhesive layer are both elastic adhesive layers.

7 Claims, 2 Drawing Sheets

(51) Int. Cl.
  *B32B 29/02* (2006.01)
  *B65D 81/02* (2006.01)
  *C09J 11/00* (2006.01)
  *C09J 175/04* (2006.01)
(52) U.S. Cl.
  CPC .............. *C09J 11/00* (2013.01); *C09J 175/04* (2013.01); *B32B 2250/03* (2013.01); *B32B 2250/40* (2013.01); *B32B 2255/12* (2013.01); *B32B 2255/26* (2013.01); *B32B 2307/7265* (2013.01); *B32B 2553/02* (2013.01)
(58) Field of Classification Search
  CPC ........ B32B 2307/7265; B32B 2553/02; B65D 81/022; B65D 81/23897; C09J 11/10; C09J 175/04
  See application file for complete search history.

(56) References Cited

U.S. PATENT DOCUMENTS

| | | | | |
|---|---|---|---|---|
| 4,529,091 A * | 7/1985 | Martin | ................ | B65D 81/056 206/453 |
| 9,731,889 B2 * | 8/2017 | Stanley | ................ | B31B 70/81 |
| 10,501,252 B1 * | 12/2019 | Mahler | ................ | B65D 65/14 |
| 2004/0213983 A1 * | 10/2004 | Nodono | ................ | B32B 5/18 428/319.7 |
| 2005/0152624 A1 * | 7/2005 | Versluys | ................ | B29C 66/328 383/107 |
| 2006/0169753 A1 * | 8/2006 | Piucci | ................ | B65D 81/03 383/3 |
| 2007/0015893 A1 * | 1/2007 | Hakuta | ................ | C08L 83/00 528/34 |
| 2007/0122584 A1 * | 5/2007 | Song | ................ | B32B 37/24 428/71 |
| 2010/0282824 A1 * | 11/2010 | Kannankeril | ........ | B31D 5/0073 493/267 |
| 2013/0075458 A1 * | 3/2013 | Kasiwabara | ......... | B65D 81/051 229/87.02 |
| 2013/0160945 A1 * | 6/2013 | Huang | ................ | B31F 1/2809 521/56 |
| 2016/0263876 A1 * | 9/2016 | Huang | ................ | C09J 123/08 |
| 2017/0361573 A1 * | 12/2017 | Malmgren | ............. | D21H 21/54 |
| 2021/0062053 A1 * | 3/2021 | Ogino | ................ | A61K 47/32 |
| 2022/0002069 A1 * | 1/2022 | Wetsch | ................ | B65D 65/42 |
| 2022/0032598 A1 * | 2/2022 | Wetsch | ................ | B32B 29/005 |
| 2022/0340351 A1 * | 10/2022 | Wehrmann | ............ | B65D 81/03 |
| 2024/0117138 A1 * | 4/2024 | Gao | ................ | C09D 131/04 |

FOREIGN PATENT DOCUMENTS

| | | | | |
|---|---|---|---|---|
| CN | 116100911 A | * | 5/2023 | |
| CN | 219982297 U | | 11/2023 | |
| JP | S49128688 U | | 11/1974 | |
| JP | S59129770 U | | 8/1984 | |
| JP | H05294341 A | | 11/1993 | |
| JP | 2007031706 A | * | 2/2007 | |
| JP | 2020200392 A | | 12/2020 | |
| WO | WO-2019078070 A1 | * | 4/2019 | ............... B32B 3/02 |

OTHER PUBLICATIONS

National Standards of the People's Republic of China; "Determination of peel strength between paper and cardboard"; Sep. 29, 2017; 14 pages.

First Examination Report received in corresponding Australian patent application No. 2024201863, dated May 30, 2024, 9 pages.

Office Action received in corresponding Japanese patent application No. 2024-032508, dated Jun. 11, 2024, 6 pages.

* cited by examiner

HIGH-STRENGTH PACKAGING BAG WITH EFFECTS OF HEAT PRESERVATION AND WATERTIGHTNESS, AND PREPARATION PROCESS THEREOF

CROSS-REFERENCE TO RELATED APPLICATION

This application is a continuation of PCT application serial no. PCT/CN2024/075144, filed on Feb. 1, 2024, which claims the priority and benefit of Chinese patent application serial no. 202410099462.7, filed on Jan. 23, 2024. The entireties of PCT application serial no. PCT/CN2024/075144 and Chinese patent application serial no. 202410099462.7 are hereby incorporated by reference herein and made a part of this specification.

FIELD OF THE INVENTION

The present application relates to the field of packaging materials, and more particularly, to a high-strength packaging bag with effects of heat preservation and watertightness, and preparation process thereof.

DESCRIPTION OF RELATED ART

The packaging bags are used for the packaging of articles. The packaging bags with different requirements and functions need to be used for different articles.

In order to improve the environmental protection and recyclability of the packaging bag, the packaging bag is generally made of recyclable paper such as kraft paper and corrugated paper. At present, common environment-friendly packaging bags are divided into the following types: the first kind of packaging bag is made of single-layer kraft paper, which has the advantage of light weight, but has low thermal insulation property, waterproof property and compressive strength; the second kind of packaging bag is made of composite corrugated paper, which has better compressive strength, but ordinary heat insulation and water resistance; the third kind of packaging bag is made of the combination of kraft paper and insulation foam, which has good thermal insulation performance, but is not environment-friendly, in addition, this packaging bag is easily wrinkled and damaged during transportation, and has low water resistance, so that the protection ability to the article is reduced. Therefore, the current environment-friendly packaging bag needs to be further improved.

BRIEF SUMMARY OF THE INVENTION

In order to solve the problems of low heat preservation performance and watertightness easy occurrence of wrinkles and damages during transportation, and reduced protection ability to articles, for the current environment-friendly packaging bag, the present application provides a high-strength packaging bag with effects of heat preservation and watertightness and a preparation process thereof.

In a first aspect, the present application provides a high-strength packaging bag with effects of heat preservation and watertightness, adopting the following technical solutions.

A high-strength packaging bag with effects of heat preservation and watertightness is made of a composite paper, in particular, the composite paper includes an outer waterproof layer, an outer paper layer, a heat-insulation and cushioning layer, an inner paper layer and an inner waterproof layer adhered in sequence; the outer paper layer and the heat-insulation and cushioning layer are adhered by a first adhesive layer; the inner paper layer and the heat-insulation and cushioning layer are adhered by a second adhesive layer; and the first adhesive layer and the second adhesive layer are both elastic adhesive layers.

In the above-mentioned technical solution, the packaging bag of the present application is combined by the composite paper. In particular, the inner paper layer and the outer paper layer have the function of improving the load-bearing property of the packaging bag and improving the compressive strength of the packaging bag, so that the packaging bag is not easy to be broken. The heat-insulation and cushioning layer can prevent the flow of air inside and outside, and has a good heat insulation and heat preservation, and also has a good buffering effect, so that the packaging bag is not easy to be wrinkled and broken when exposed to the external pressure, improving the protection to the packaged articles. The outer waterproof layer and the inner waterproof layer have a waterproof function, blocking the flow of moisture and air and further improving the waterproof and heat insulation properties of the packaging bag. The first adhesive layer is adhered to the outer paper layer and the heat-insulation and cushioning layer. The second adhesive layer is adhered to the inner paper layer and the heat-insulation and cushioning layer. The first adhesive layer and the second adhesive layer are elastic adhesive layers capable of cooperating with the heat-insulation and cushioning layer. When the packaging bag is subjected to an external pressure, the external pressure is uniformly dispersed and rebounded by the outer paper layer, the heat-insulation and cushioning layer and the inner paper layer, so as to reduce the problem of easy wrinkling of the inner paper layer and the outer paper layer, and improve the compressive strength of the packaging bag. Therefore, the packaging bag is not easy to be broken.

Preferably, a first cushioning structure is disposed at a side of the outer waterproof layer adjacent to the heat-insulation and cushioning layer; a second cushioning structure is disposed at a side of the inner waterproof layer adjacent to the heat-insulation and cushioning layer, wherein the first cushioning structure and the second cushioning structure are same; and the first cushioning structure and the second cushioning structure are symmetrically arranged.

In the above-mentioned technical solution, the first cushioning structure and the second cushioning structure are symmetrically arranged, and the structures of the first cushioning structure and the second cushioning structure are same. When the packaging bag is subjected to an external pressure, the first cushioning structure of the outer paper layer and the second cushioning structure of the inner paper layer cooperate with the heat-insulation and cushioning layer, so that the surface of the packaging bag uniformly buffers and rebounds the external pressure, further improving the compression resistance of the packaging bag, and reducing the situation where the packaging bag is wrinkled and broken.

Preferably, the first cushioning structure is composed of a plurality of protrusions, and a horizontal height of each of the plurality of protrusions is gradually increased from a central region to a peripheral edge region of the outer paper layer.

In the above-mentioned technical solution, the horizontal height of the protrusion adjacent to the central region of the outer paper layer is relatively low, and the horizontal height of the protrusion adjacent to the peripheral edge region of the outer paper layer is relatively high, so that the thickness of the first adhesive layer between the central region of the outer paper layer and the heat-insulation and cushioning layer is relatively thick, while the thickness of the first adhesive layer between the peripheral edge region of the outer paper layer and the heat-insulation and cushioning layer is relatively thin. Generally, the central region of a packaging bag is easy to be pressed and wrinkled. Therefore, the first adhesive layer corresponding to the central region of the outer paper layer and the heat-insulation and cushioning layer cooperate well, and have a cushioning effect on the central region of the outer paper layer, so that the outer paper layer will be subjected to a squeezing action dispersed around, improving the compressive strength of the packaging bag, further making the packaging bag not easy to be wrinkled and broken.

Further, in the present application, the horizontal height of the protrusion in the central region of the outer paper layer is ⅓-¾ of the height of the outer paper layer, so that the outer paper layer can have better insulation performance, and can also have better cushioning elasticity, so as to reduce the occurrence of wrinkles and breakage of the packaging bag.

Preferably, a distribution density of each of the plurality of protrusions is gradually decreased from the central region to the peripheral edge region of the outer paper layer.

In the above-mentioned technical solution, since the central region of the packaging bag is easily wrinkled by being pressed by the outside, the distribution density of the protrusion in the central region of the outer paper layer is increased to uniformly disperse the pressure, and the situation of wrinkling and breakage can be reduced. The first cushioning structure cooperates with the first adhesive layer and the heat-insulation and cushioning layer, so that the pressure is uniformly dispersed and released. In the process of combining the edge regions of the packaging bag, the packaging bag itself needs to be wrinkled. Therefore, the thickness of the peripheral edge regions of the outer paper layer is controlled to be relatively thick, and is easily shaped. The package can maintain a three-dimensional shape and is not easily deformed while having cushioning properties.

Preferably, the heat-insulation and cushioning layer is any one selected from the group consisting of aerogel cotton, organosilicon cotton and pearl cotton.

In the above-mentioned technical solution, the above-mentioned heat-insulation and cushioning layer has better heat insulation and cushioning elasticity, and can improve the heat preservation and cushioning performance of the obtained packaging bag.

Preferably, the first adhesive layer and the second adhesive layer are formed by curing an adhesive prepared from the following raw materials in parts by weight:
40-60 parts of polyurethane emulsion,
12-22 parts of tackifier,
4-8 parts of impregnating agent,
0.5-2 parts of long-chain alkyl silane coupling agent, and
20-30 parts of water.

In the above-mentioned technical solution, in order to further improve the compressive strength and wrinkle resistance of the prepared high-strength packaging bag with effects of heat preservation and watertightness, and at the same time achieve the adhering stability between multiple layers, the adhesive of the present application is used. Polyurethane emulsion is used as a resin body in the adhesive of the present application. The polyurethane emulsion has a good adhesion, and after curing, has a better elasticity and toughness. The tackifier has the function of improving the bonding ability, and can carry the polyurethane emulsion, further improving the bonding ability of the prepared adhesive. The impregnating agent and the tackifier have a good synergistic effect, improving the uniform dispersion property of the prepared adhesive on the surface of the heat-insulation and cushioning layer, which causes the adhesive to uniformly wet and disperse into a gap between the first cushioning structure and the second cushioning structure, so that the outer paper layer, the heat-insulation and cushioning layer and the inner paper layer can be stably bonded. The long-chain alkyl silane coupling agent has a long carbon chain, being able to further improve the dispersion stability among the polyurethane emulsion, the tackifier and the impregnating agent. Thus, the prepared adhesive has better bonding stability and elasticity after curing.

Preferably, the tackifier is prepared by the following steps:
A1, adding 10-18 parts of starch to 80-120 parts of water, in parts by weight, adding dropwise 0.3-0.8 parts of 1-2 mol/L hydrochloric acid aqueous solution, in parts by weight, heating to 65-85° C., and stirring for 30-60 min to obtain a starch hydrolysate; and
A2, adding 0.2-0.5 parts of diethylene glycol, 0.1-0.3 parts of acrylate copolymer and 1-3 parts of magnesium aluminum silicate, in parts by weight, to the starch hydrolysate, and stirring uniformly to obtain a tackifier.

In the above-mentioned technical solution, firstly, the starch is hydrolyzed in an acidic condition, so that the molecular structure of the starch becomes loose and stable, improving the water absorption and swelling action of the starch and the bearing action to the polyurethane emulsion. Then diethylene glycol, an acrylate copolymer and magnesium aluminum silicate are added and compounded with the starch hydrolysate. The diethylene glycol has a soft long-chain ether group segment, which can improve the dispersibility of the acrylate copolymer and magnesium aluminum silicate in the starch hydrolysate. The addition of the acrylate copolymer and magnesium aluminum silicate can further improve the flowability and adsorption performance of the starch hydrolysate. The prepared tackifier can adsorb the polyurethane emulsion stably and has good bonding stability.

Preferably, the impregnating agent includes oleylamine polyoxyethylene ether and polyvinyl alcohol in a weight ratio of 1:(0.2-0.6).

In the above-mentioned technical solution, the preferred ratio of oleylamine polyoxyethylene ether and polyvinyl alcohol has a good synergistic effect, which can improve the wettability and bonding performance of the prepared adhesive, thereby improving the bonding stability among the outer paper layer, the heat-insulation and cushioning layer and the inner paper layer of the packaging bag.

Preferably, the adhesive is prepared by the following steps:
B1, adding the impregnating agent into water, and stirring uniformly to obtain a mixed solution; and
B2, adding the polyurethane emulsion, the tackifier and the long-chain alkyl silane coupling agent to the mixed solution, and stirring uniformly to prepare the adhesive.

In the above-mentioned technical solution, firstly, the impregnating agent is dissolved in water to form a uniformly dispersed mixed solution. Under the action of the impregnating agent, the polyurethane emulsion, the tackifier and the long-chain alkyl silane coupling agent are uniformly dispersed to prepare an adhesive with a stable property and a good bonding performance.

In a second aspect, the present application provides a preparation process of a high-strength packaging bag with effects of heat preservation and watertightness, adopting the following technical solutions.

A preparation process of a high-strength packaging bag with effects of heat preservation and watertightness including the following steps:

S1, coating the adhesive on a side of the heat-insulation and cushioning layer to form the first adhesive layer, attaching the outer paper layer on the first adhesive layer, warming and drying;

S2, coating the adhesive on a side of the heat-insulation and cushioning layer away from the outer paper layer to form the second adhesive layer, attaching the inner paper layer on the second adhesive layer, warming and drying;

S3, coating the waterproof agent to the inner paper layer to form the inner waterproof layer, coating the waterproof agent to the outer paper layer to form the outer waterproof layer, and drying to obtain the composite paper; and S4, cutting and combining the composite paper to obtain the high-strength packaging bag with effects of heat preservation and watertightness.

In the above-mentioned technical solution, a packaging bag is prepared, which has good effects of heat preservation, watertightness and high strength and is not easy to be wrinkled, deformed and broken.

In summary, the present application has the following beneficial effects.

1. The high-strength packaging bag with effects of heat preservation and watertightness of the present application, including an outer waterproof layer, an outer paper layer, a first adhesive layer, a heat-insulation and cushioning layer, a second adhesive layer, an inner paper layer and an inner waterproof layer, has good effects of heat preservation and watertightness. It is not easy to be wrinkled and broken, has good protection to articles, and provides a wide application range.

2. A first cushioning structure is disposed at a side of the outer waterproof layer adjacent to the heat-insulation and cushioning layer, and a second cushioning structure is disposed at a side of the inner waterproof layer adjacent to the heat-insulation and cushioning layer. The structures of the first cushioning structure and the second cushioning structure are same. The first cushioning structure is composed of a plurality of protrusions. The horizontal height of the protrusions gradually increases from a central region to a peripheral edge region of the outer paper layer, and the distribution density of the protrusions gradually decreases from the central region to the peripheral edge region of the outer paper layer, so that the thickness of the first adhesive layer between the central region of the outer paper layer and the heat-insulation and cushioning layer is relatively thick, and the thickness of the first adhesive layer between the peripheral edge region of the outer paper layer and the heat-insulation and cushioning layer is relatively thin. When the packaging bag is subjected to an external pressure, the outer paper layer, the first adhesive layer, the heat-insulation and cushioning layer, the second adhesive layer and the inner paper layer cooperate well, enabling the pressure to be uniformly dispersed, and reducing the occurrence of wrinkles and breakage. Moreover, in the process of combining the edge regions of the packaging bag, the packaging bag itself needs to be wrinkled. Therefore, the thickness of the peripheral edge regions of the outer paper layer is controlled to be relatively thick, and is easily shaped. The package can maintain a three-dimensional shape and is not easily deformed while having cushioning properties.

3. The adhesive is prepared by using polyurethane emulsion, tackifier, impregnating agent, long-chain alkyl silane coupling agent and water. In particular, the tackifier is composed of starch, diethylene glycol, acrylate copolymer and magnesium aluminum silicate. The impregnating agent is composed of oleylamine polyoxyethylene ether and polyvinyl alcohol. The tackifier and the impregnating agent have good synergistic effect, so that the polyurethane emulsion is stably adsorbed, and the adhesive thus prepared has good bonding stability. The first adhesive layer and the second adhesive layer formed after curing have good elasticity, which can further improve the strength and cushioning performance of the packaging bag.

Figure 1:
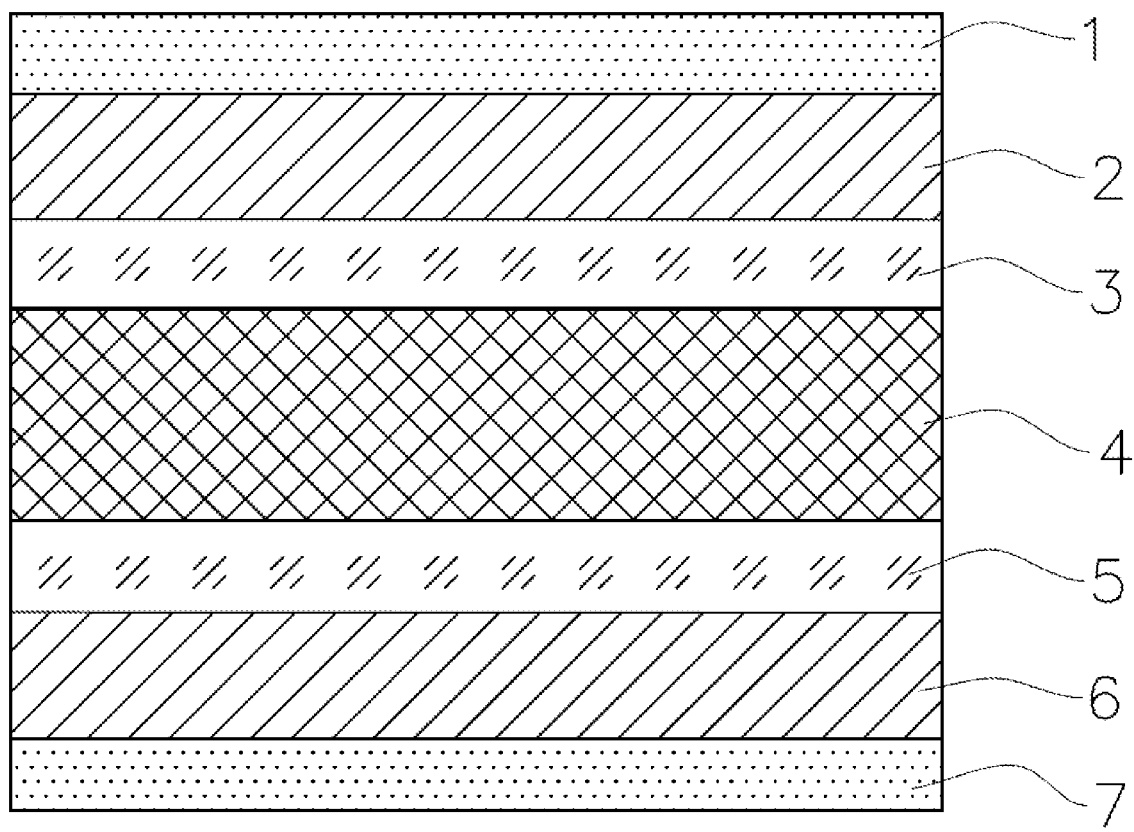
FIG. 1 is a schematic diagram showing the interlaminar structure of a composite paper of a high-strength packaging bag with effects of heat preservation and watertightness according to Example 1 of the present application.

Reference numerals: 1, outer waterproof layer; 2, outer paper layer, 21, first cushioning structure; 3, first adhesive layer; 4, heat-insulation and cushioning layer; 5, second adhesive layer; 6, inner paper layer; 61, second cushioning structure; 7, inner waterproof layer.

DETAILED DESCRIPTION

The present application is described in further detail below with reference to FIGS. 1-3 and Examples.

The following are the sources and specifications of some raw materials of the present application. The raw materials in the preparation examples and examples of the present application may be obtained commercially. The raw materials used in the present application include but are not limited to those of the specific models and manufacturers disclosed below. The raw materials with the same specification parameters and properties may be used:

1, starch: corn starch; industrial grade; content, 99%;
2, acrylate copolymer: carbomer U21; available from Lubrizol;
3, magnesium aluminum silicate: 325 meshes; content, 99%; pH=6.3; whiteness, 90%; 4, kaolin: calcined kaolin; 325 meshes; density, 2.54-2.60 g/cm$^3$;
5, polyurethane emulsion: available from Bayer; content, 40-50%; viscosity 700-1500 mPa·s at 25° C.; pH=7-9; density, 1.04-1.09 g/cm$^3$;
6, oleylamine polyoxyethylene ether: (Z)-2,2'-(octadec-9-enylimino) bisethanol;
7, polyvinyl alcohol: molecular weight, 25,000-35,000 Daltons; content, 99%; pH=4.5-6.5.

Preparation Examples of Tackifiers

Preparation Example 1

Preparation Example 1 discloses a tackifier prepared by the following steps.

A1. 1 kg of starch was added to 8 kg of water. 0.03 kg of 1 mol/L hydrochloric acid aqueous solution was dropwise added, the temperature was increased to 65° C., while stirring for 30 minutes, to obtain a starch hydrolysate.

A2. The tackifier was prepared by adding 0.02 kg of diethylene glycol, 0.01 kg of carbomer U21 and 0.1 kg of magnesium aluminum silicate to the starch hydrolysate and stirring for 20 min at a stirring rate of 300 r/min.

Preparation Examples 2-3

Preparation Examples 2-3 differ from Preparation Example 1 in the amount of raw materials used and the preparation conditions. See Table 1 below for details.

TABLE 1

Table of raw material amounts and preparation conditions of Preparation Examples 1-3

| | | | Preparation Examples | | |
|---|---|---|---|---|---|
| Items | | | Preparation Example 1 | Preparation Example 2 | Preparation Example 3 |
| A1 steps, and starch hydrolysate preparation | Starch | Amount/kg | 1 | 1.4 | 1.8 |
| | Water | Amount/kg | 8 | 10 | 12 |
| | Hydrochloric acid aqueous solution | Concentration/mol/L | 1 | 1.5 | 2 |
| | | Amount/kg | 0.03 | 0.06 | 0.08 |
| | temperature/° C. | | 65 | 75 | 85 |
| | Stirring time/min | | 30 | 45 | 60 |
| A2 steps, and tackifier preparation | Diethylene glycol | Amount/kg | 0.02 | 0.035 | 0.05 |
| | Carbomer U21 | Amount/kg | 0.01 | 0.02 | 0.03 |
| | Magnesium aluminum silicate | Amount/kg | 0.1 | 0.2 | 0.3 |
| | Stirring time/min | | 20 | 30 | 40 |
| | Stirring rate/r/min | | 300 | 600 | 1000 |

Preparative Comparative Example 1 differs from Preparation Example 1 in that diethylene glycol was replaced by polyethylene glycol 400 in equal amounts, and the others were the same as those in Preparation Example 1.

Preparative Comparative Example 2

Preparation Comparative Example 2 differs from Preparation Example 1 in that magnesium aluminum silicate was replaced by kaolin in equal amounts, and the others were the same as those in Preparation Example 1.

Preparative Comparative Example 3

Preparation Comparative Example 3 differs from Preparation Example 1 in that carbomer U21 was replaced by hydroxyethyl methylcellulose in equal amounts, and the others were the same as those in Preparation Example 1.

Preparative Comparative Example 4

Preparation Comparative Example 4 differs from Preparation Example 1 in that the magnesium aluminum silicate was replaced by carbomer U21 in equal amounts, and the others were the same as those in Preparation Example 1.

Preparation Examples of Adhesives

Preparation Example 4

Preparation Example 4 discloses an adhesive prepared by the following steps.

B1. 0.4 kg of polyvinyl alcohol was added as a impregnating agent to 2 kg of water at a temperature of 60° C., while stirring uniformly at a stirring rate of 300 r/min for 20 min, to prepare a mixed solution.

B2. 4 kg of polyurethane emulsion, 1.2 kg of hydroxyethyl methylcellulose as a tackifier and 0.05 kg of dodecyl trimethoxy silane as a silane coupling agent were added to the mixed solution, while stirring uniformly at a stirring rate of 300 r/min for 30 min, to prepare an adhesive.

Preparation Examples 5-6

Preparation Examples 5-6 differ from Preparation Example 1 in the amount of raw materials used and the preparation conditions. See Table 2 below for details.

TABLE 2

Table of raw material amounts and preparation conditions of Preparation Examples 4-6

| | | | Preparation Examples | | |
|---|---|---|---|---|---|
| Items | | | Preparation Example 4 | Preparation Example 5 | Preparation Example 6 |
| B1, mixed solution preparation | Impregnating agent | Kinds | Polyvinyl alcohol | Polyvinyl alcohol | Polyvinyl alcohol |
| | | Amount/kg | 0.4 | 0.6 | 0.8 |

TABLE 2-continued

Table of raw material amounts and preparation conditions of Preparation Examples 4-6

| Items | | | Preparation Example 4 | Preparation Example 5 | Preparation Example 6 |
|---|---|---|---|---|---|
| | Water | Amount/kg | 2 | 2.5 | 3 |
| | Stirring temperature/° C. | | 60 | 65 | 70 |
| | Stirring time/min | | 20 | 30 | 40 |
| | Stirring rate/r/min | | 300 | 600 | 900 |
| B2, adhesive preparation | Polyurethane emulsion | Amount/kg | 4 | 5 | 6 |
| | Tackifier | Kinds | Hydroxyethyl methylcellulose | Hydroxyethyl methylcellulose | Maltodextrin |
| | | Amount/kg | 1.2 | 1.8 | 2.2 |
| | Long-chain alkyl silane coupling agent | Kinds | Dodecyl trimethoxy silane | Dodecyl trimethoxy silane | Dodecyl trimethoxy silane |
| | | Amount/kg | 0.05 | 0.1 | 0.2 |
| | Stirring time/min | | 30 | 45 | 60 |
| | Stirring rate/r/min | | 500 | 1000 | 1500 |

Preparation Examples 7-13

Preparation Examples 7-13 differ from Preparation Example 4 in that the source of the tackifier is different. See Table 3 below.

TABLE 3

Table of Sources of Tackifiers for Preparation Examples 7-13

| Preparation Examples | Sources of tackifiers |
|---|---|
| Preparation Example 7 | Preparation Example 1 |
| Preparation Example 8 | Preparation Example 2 |
| Preparation Example 9 | Preparation Example 3 |
| Preparation Example 10 | Preparative Comparative Example 1 |
| Preparation Example 11 | Preparative Comparative Example 2 |
| Preparation Example 12 | Preparative Comparative Example 3 |
| Preparation Example 13 | Preparative Comparative Example 4 |

Preparation Example 14

Preparation Example 14 differs from preparation example 7 in that the impregnating agent was different. The impregnating agent in Preparation Example 14 was composed of oleylamine polyoxyethylene ether and polyvinyl alcohol. The amount of oleylamine polyoxyethylene ether was 0.33 kg. The amount of polyvinyl alcohol was 0.07 kg, and the others were the same as those in Preparation Example 7.

Preparation Example 15

Preparation Example 15 differs from Preparation Example 7 in that the impregnating agent in Preparation Example 15 was composed of oleylamine polyoxyethylene ether and polyvinyl alcohol. The amount of oleylamine polyoxyethylene ether was 0.25 kg. The amount of polyvinyl alcohol was 0.15 kg, and the others were the same as those in Preparation Example 7.

Preparative Comparative Example 5

Preparative Comparative Example 5 differs from Preparation Example 14 in that the long-chain alkyl silane coupling agent was replaced by the methyltriethoxysilane coupling agent in equal amounts, and the others were the same as those in Preparation Example 14.

EXAMPLES

Example 1

Example 1 discloses a high-strength packaging bag with effects of heat preservation and watertightness, which was prepared by cutting and combining a composite paper. With reference to FIG. 1, the composite paper includes an outer waterproof layer, an outer paper layer, a heat-insulation and cushioning layer, an inner paper layer and an inner waterproof layer adhered in sequence. The outer paper layer and the heat-insulation and cushioning layer were adhered by a first adhesive layer. The inner paper layer and the heat-insulation and cushioning layer were adhered by a second adhesive layer. The outer waterproof layer and the inner waterproof layer were polyethylene (PE) waterproof layers. The outer paper layer and the inner paper layer were both kraft paper. The thickness of the kraft paper was 0.1-1 mm. The thickness of the kraft paper in this Example is 0.5 mm. The heat-insulation and cushioning layer was aerogel cotton, organosilicon cotton, pearl cotton, etc. The heat-insulation and cushioning layer in this Example was organosilicon cotton. The thickness of the heat-insulation and cushioning layer was 0.1-2 mm. The thickness of the heat-insulation and cushioning layer in this Example was 1 mm. Both the first adhesive layer and the second adhesive layer were adhesive layers having elasticity and were prepared by curing the adhesive.

The high-strength packaging bag with effects of heat preservation and watertightness was prepared by the following steps.

S1, a commercially available adhesive was coated on a side of the heat-insulation and cushioning layer, with the coating amount controlled to be 30 g/m² to form a first adhesive layer. The first adhesive layer was adhered with an outer paper layer. The temperature was maintained at 40° C. for 20 min, and then drying was performed under the condition of 100° C.

S2, a commercially available adhesive was coated a side of the heat-insulation and cushioning layer away from the outer paper layer, with the coating amount controlled to be 30 g/m² to form a second adhesive layer. The second adhesive layer was adhered with the outer paper layer. The temperature was maintained at 40° C. for 20 min, and then drying was performed under the condition of 100° C.

S3, the PE material was melted to form a PE waterproof agent for tape-casting and coating the inner paper layer to form an inner waterproof layer. The PE waterproof agent was coated on the outer paper layer to form an outer waterproof layer. The coating amount of the PE waterproof agent was controlled to be 10 g/m², dried at a temperature of 20° C. for a drying time of 30 min to prepare a composite paper.

S4, the composite paper was cut and combined to prepare a high-strength packaging bag with effects of heat preservation and watertightness.

In particular, the commercially available adhesive was waterborne polyurethane adhesive from Depont Nanotechnology; viscosity, 100-450 cps at 25° C.; solid content, 40%; pH=7.0-8.5;

PE material: low density polyethylene; available from Dow chemistry; model 4203;
Aerogel cotton: thermal conductivity, 0.02 W/(m·K); compressive strength, 18 MPa; density, 180-220 kg/m³;
Organosilicon cotton: thermal conductivity, 0.02 W/(m·K); density, 120-160 kg/m³; and
Pearl cotton: EPE foamed cotton, thermal conductivity, 0.02 W/(m·K); density, 28-35 kg/m³.

Examples 2-3

Examples 2-3 differ from Example 1 in that the preparation process parameters were different and the sources of the adhesives were different. See Table 4 below for details.

TABLE 4

Table of preparation process parameters and sources of adhesives in Examples 1-3

| Items | | Example 1 | Example 2 | Example 3 |
|---|---|---|---|---|
| S1 step | Source of Adhesive | Commercially available | Commercially available | Commercially available |
| | Coating amount of adhesive g/m² | 30 | 40 | 50 |
| | Heat preservation time/min | 20 | 30 | 40 |
| | Heat preservation temperature/° C. | 40 | 50 | 60 |
| | Drying temperature/° C. | 100 | 110 | 120 |
| S2 step | Source of Adhesive | Commercially available | Commercially available | Commercially available |
| | Coating amount of adhesive g/m² | 30 | 40 | 50 |
| | Heat preservation time/min | 20 | 30 | 40 |
| | Heat preservation temperature/° C. | 40 | 50 | 60 |
| | Drying temperature/° C. | 100 | 110 | 120 |
| S2 step | Coating amount of PE waterproof agent g/m² | 10 | 15 | 20 |
| | Drying temperature/° C. | 20 | 28 | 35 |
| | Drying time/min | 30 | 40 | 50 |

Example 4

Figure 2:
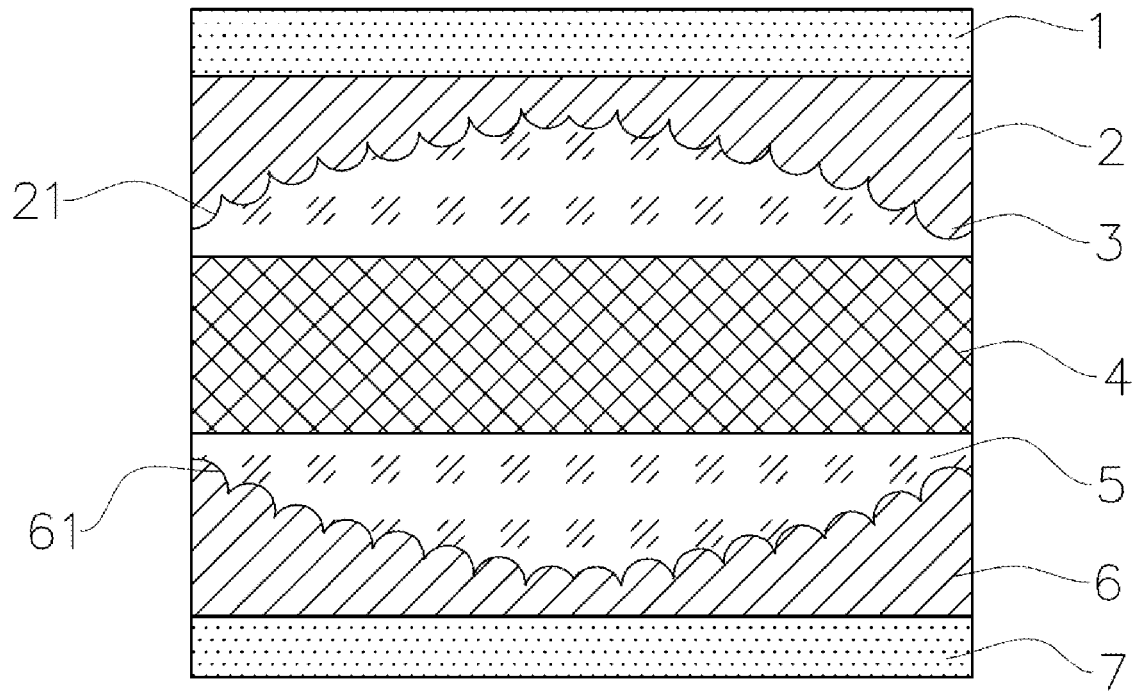
FIG. 2 is a schematic view showing the interlaminar structure of a composite paper of a high-strength packaging bag with effects of heat preservation and watertightness according to Example 4 of the present application.

Example 4 differs from Example 1 in that, with reference to FIG. 2, the structure of the composite paper was different. A first cushioning structure was disposed at a side of the outer waterproof layer adjacent to the heat-insulation and cushioning layer, and a second cushioning structure was disposed at a side of the inner waterproof layer adjacent to the heat-insulation and cushioning layer. The structures of the first cushioning structure and the second cushioning structure were same. The first cushioning structure was composed of a plurality protrusions. The horizontal height of the protrusions gradually increased from a central region to a peripheral edge region of the outer paper layer. The first cushioning structure and the second cushioning structure were the same, the distribution density of the protrusions was the same, and the others were the same as those in Example 1.

Example 5

Figure 3:
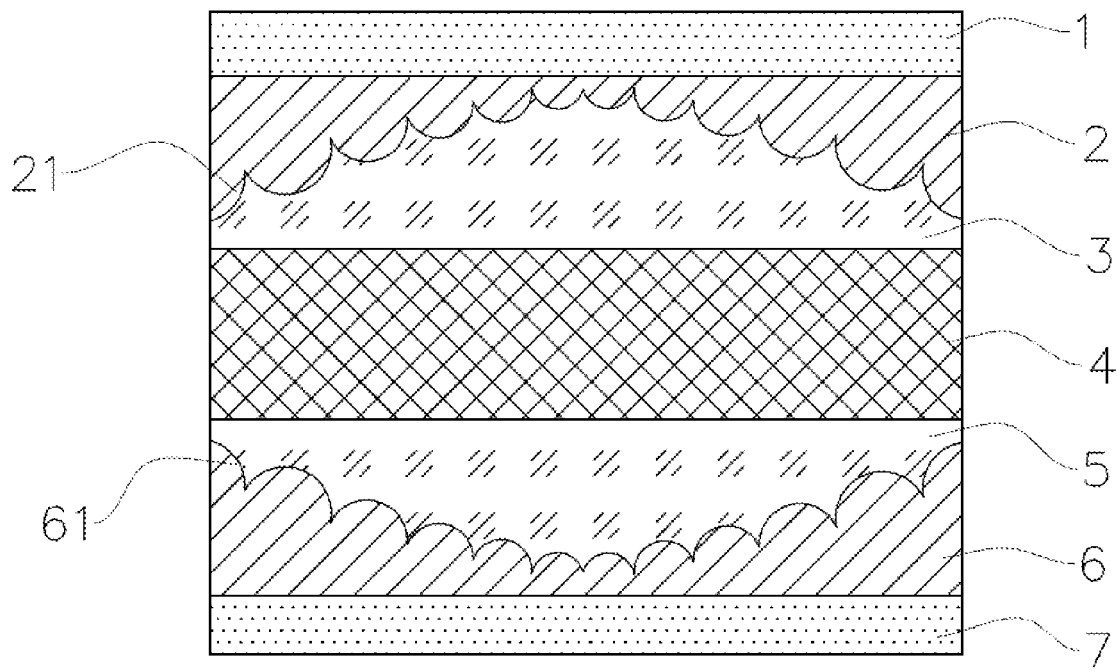
FIG. 3 is a schematic view showing the interlaminar structure of composite paper for a high-strength packaging bag with effects of heat preservation and watertightness according to Example 5 of the present application.

Examples 5 differs from Examples 4 in that, with reference to FIG. 3, on the basis of Example 4, the distribution density of the protrusion gradually decreases from the central region to the peripheral edge region of the outer paper layer, the distribution density of the protrusion of the inner paper layer was the same as that of the outer paper layer, and the others were the same as those in Example 4.

Examples 6-18

Examples 6-18 differ from Example 5 in that the sources of the adhesive were different. See Table 5 below for details.

TABLE 5

Sources of adhesives in Examples 6-18

| Examples | Source of adhesive |
|---|---|
| Example 6 | Preparation Example 4 |
| Example 7 | Preparation Example 5 |
| Example 8 | Preparation Example 6 |
| Example 9 | Preparation Example 7 |
| Example 10 | Preparation Example 8 |
| Example 11 | Preparation Example 9 |
| Example 12 | Preparation Example 10 |
| Example 13 | Preparation Example 11 |
| Example 14 | Preparation Example 12 |
| Example 15 | Preparation Example 13 |
| Example 16 | Preparation Example 14 |
| Example 17 | Preparation Example 15 |
| Example 18 | Preparative Comparative Example 5 |

Performance Detection Test

The high-strength packaging bag with effects of heat preservation and watertightness prepared in Examples 1-18 were subjected to performance tests as follows:

(1) Folding Endurance Test

The folding endurance of the high-strength packaging bag with effects of heat preservation and watertightness (unit: times) was determined according to the test method in GB/T 13024-2003. The results were recorded.

(2) Bursting Strength Test

The burst index of the high-strength packaging bag with effects of heat preservation and watertightness (unit: kpa·m²/g) was determined according to the test method in GB/T 13024-2003. The results were recorded.

(3) Peel Strength Test

The peel strength of the high-strength packaging bag with effects of heat preservation and watertightness (unit: N/cm) was determined according to the test method in GB/T 34444-2017. The results were recorded.

The following are performance test data for the high-strength packaging bag with effects of heat preservation and watertightness prepared in Examples 1-18. See Table 6 below for details.

TABLE 6

Performance test data table for high-strength packaging bag with effects of heat preservation and watertightness in Examples 1-18

| Examples | Items Folding endurance/time | Burst index/ kPa · m²/g | Peel strength/ N/cm |
|---|---|---|---|
| Example 1 | 69 | 2.25 | 9.21 |
| Example 2 | 70 | 2.3 | 9.44 |
| Example 3 | 71 | 2.35 | 9.42 |
| Example 4 | 72 | 2.45 | 10.1 |
| Example 5 | 73 | 2.5 | 10.5 |
| Example 6 | 75 | 2.65 | 11.07 |
| Example 7 | 75 | 2.7 | 11.09 |
| Example 8 | 76 | 2.7 | 11.12 |
| Example 9 | 81 | 2.9 | 11.91 |
| Example 10 | 82 | 2.95 | 11.96 |
| Example 11 | 83 | 2.95 | 12 |
| Example 12 | 79 | 2.8 | 11.61 |
| Example 13 | 80 | 2.9 | 11.67 |
| Example 14 | 80 | 2.85 | 11.74 |
| Example 15 | 78 | 2.8 | 11.49 |
| Example 16 | 84 | 3 | 12.26 |
| Example 17 | 85 | 3 | 12.3 |
| Example 18 | 82 | 2.9 | 11.93 |

In combination with Examples 1-5 and Table 6, it can be seen that the first cushioning structure of the outer paper layer and the second cushioning structure of the inner paper layer cooperate with the heat-insulation and cushioning layer in the present application, which may improve the strength of the prepared packaging bag and cause the interlayer bonding more stable, and it is less prone to be wrinkled and deformed. The protrusions in Example 2 are evenly distributed, while the protrusions in Example 3 has a successively decreased distribution density from the central region to the peripheral edge region. It can be seen from the data that the peel strength in Example 2 is slightly greater than that in Example 3. Use of the protrusions with uniform distribution is possibly more conducive to adhering. However, the fold resistance and burst index in Example 2 are significantly greater than those in Example 3, indicating that the difference in the distribution density of the protrusion can improve the strength of the prepared packaging bag. In summary, the performance of the packaging bag in Example 3 is better.

It can be seen in combination with Examples 1-5 and Examples 6-15 and in combination with Table 6 that the use of the tackifier of the present application may further improve the bonding stability of the prepared adhesive and improve the strength of the prepared packaging bag. However, in Examples 12-15, no starch, diethylene glycol, carbomer U21 and magnesium aluminum silicate is used for compounding, the strength of the prepared packaging bag is reduced and the folding resistance is also reduced, indicating that the starch, diethylene glycol, carbomer U21 and magnesium aluminum silicate can produce a good synergistic effect and the strength of the prepared packaging bag is better.

It can be seen by combining with Examples 9-11 and Examples 16-17 and in combination with Table 6 that using the preferred ratio of oleylamine polyoxyethylene ether and polyvinyl alcohol of the present application for compounding may produce a better synergistic effect with the tackifier, further improving the interlayer bonding stability of the packaging bag and improving the strength of the prepared packaging bag.

As can be seen in combination with Examples 16-17 and Example 18 and in combination with Table 6, the use of a long-chain alkyl silane coupling agent improves the strength of the prepared packaging bag.

In summary, in the present application, a composite paper is formed by adhering an outer waterproof layer, an outer paper layer, a first adhesive layer, a heat-insulation and cushioning layer, a second adhesive layer, an inner paper layer and an inner waterproof layer. The packaging bag prepared from the composite paper has better thermal insulation property, waterproof property and strength. At the same time, the adhesive of the present application is used for curing to form a first adhesive layer and a second adhesive layer, which have better elasticity and bonding property, are not easy to be wrinkled and deformed when exposed to external pressure, and further improve the cushioning performance and strength of the obtained packaging bag.

The specific embodiments are merely an explanation to the present application and is not a limitation to the present application. After reading this specification, a person skilled in the art may modify this embodiment without creative contribution as needed, but as long as it is within the scope of the claims of this application, it is protected by the patent law.

What is claimed is:
1. A packaging bag, wherein the packaging bag is made of a composite paper, wherein the composite paper comprises an outer waterproof layer, an outer paper layer, a heat-insulation and cushioning layer, an inner paper layer and an inner waterproof layer adhered to one another in sequence; the outer paper layer and the heat-insulation and cushioning layer are adhered together by a first adhesive layer; the inner paper layer and the heat-insulation and cushioning layer are adhered together by a second adhesive layer; and the first adhesive layer and the second adhesive layer are both elastic adhesive layers;
wherein the first adhesive layer and the second adhesive layer are formed by curing an adhesive prepared from the following materials in parts by weight:
40-60 parts of polyurethane emulsion,
12-22 parts of tackifier,
4-8 parts of impregnating agent,
0.5-2 parts of alkyl silane coupling agent, and
20-30 parts of water;
wherein the tackifier is prepared by the following steps:
A1, adding 10-18 parts of starch to 80-120 parts of the water, in parts by weight, adding dropwise 0.3-0.8 parts of 1-2 mol/L hydrochloric acid aqueous solution, in parts by weight, heating to 65-85° C., and stirring for 30-60 min to obtain a starch hydrolysate; and
A2, adding 0.2-0.5 parts of diethylene glycol, 0.1-0.3 parts of acrylate copolymer and 1-3 parts of magnesium aluminum silicate, in parts by weight, to the starch hydrolysate, and stirring uniformly to obtain the tackifier.
2. The packaging bag according to claim 1, wherein a first cushioning structure is provided at a side of the outer waterproof layer adjacent to the heat-insulation and cushioning layer; a second cushioning structure is provided at a side of the inner waterproof layer adjacent to the heat-insulation and cushioning layer; the first cushioning structure is identical to the second cushioning structure; and the first cushioning structure and the second cushioning structure are symmetrically arranged.

3. The packaging bag according to claim 2, wherein the first cushioning structure comprises a plurality of protrusions; each protrusion of the plurality of protrusions having a height in a thickness direction of the composite paper extending from the outer waterproof layer to the first adhesive layer; and the plurality of protrusions gradually increase in height from a central region to a peripheral edge region of the outer paper layer.

4. The packaging bag according to claim 3, wherein a distribution density of each of the plurality of protrusions is gradually decreased from the central region to the peripheral edge region of the outer paper layer.

5. The packaging bag according to claim 1, wherein the heat-insulation and cushioning layer is any one selected from the group consisting of aerogel cotton, organosilicon cotton and pearl cotton.

6. The packaging bag according to claim 1, wherein the impregnating agent comprises oleylamine polyoxyethylene ether and polyvinyl alcohol in a weight ratio of 1:(0.2-0.6).

7. The packaging bag according to claim 1, wherein the adhesive is prepared by the following steps:
    B1, adding the impregnating agent into the water, and stirring uniformly to obtain a mixed solution; and
    B2, adding the polyurethane emulsion, the tackifier and the long-chain alkyl silane coupling agent to the mixed solution, and stirring uniformly to prepare the adhesive.

\* \* \* \* \*